US010640107B2

(12) United States Patent
Weiß et al.

(10) Patent No.: US 10,640,107 B2
(45) Date of Patent: May 5, 2020

(54) METHOD AND CONTROL DEVICE FOR DETECTING A COMBUSTION PROCESS OF AN INTERNAL COMBUSTION ENGINE OF A HYBRID VEHICLE

(71) Applicant: Volkswagen Aktiengesellschaft, Wolfsburg (DE)

(72) Inventors: Norbert Weiß, Sickte (DE); Christian Piasecki, Braunschweig (DE); Samuel Trebesius, Wahrenholz (DE); Grit Freiwald, Gifhorn (DE); Florian Thauer, Gifhorn (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 390 days.

(21) Appl. No.: 15/493,081

(22) Filed: Apr. 20, 2017

(65) Prior Publication Data

US 2017/0217427 A1    Aug. 3, 2017

Related U.S. Application Data

(63) Continuation of application No. PCT/EP2015/070782, filed on Sep. 11, 2015.

(30) Foreign Application Priority Data

Oct. 21, 2014    (DE) .................... 10 2014 221 293

(51) Int. Cl.
*B60W 20/50*    (2016.01)
*F02D 41/00*    (2006.01)
(Continued)

(52) U.S. Cl.
CPC ............ *B60W 20/50* (2013.01); *B60W 20/40* (2013.01); *B60W 50/0205* (2013.01);
(Continued)

(58) Field of Classification Search
None
See application file for complete search history.

(56) References Cited

U.S. PATENT DOCUMENTS 5,380,014 A    1/1995    Schäperkötter
5,503,009 A    4/1996    Angermeier et al.
(Continued)

FOREIGN PATENT DOCUMENTS

CN    101263293 A    9/2008
CN    102171082 A    8/2011
(Continued)

OTHER PUBLICATIONS

English translation of DE102012219466 (Year: 2019).*
(Continued)

*Primary Examiner* — Nicholas K Wiltey
(74) *Attorney, Agent, or Firm* — Manfred Beck, P.A.

(57) ABSTRACT

A method for detecting a combustion process of an internal combustion engine of a hybrid vehicle includes the steps of acquiring a rotational speed signal representing a rotational speed of the crankshaft, acquiring a crankshaft angle signal representing a crankshaft angle of the crankshaft, and determining, based on the rotational speed signal and the crankshaft angle signal, whether a combustion occurs in the internal combustion engine. A control device for detecting a combustion process of an internal combustion engine of a hybrid vehicle is also provided.

12 Claims, 5 Drawing Sheets

(51) Int. Cl.
*F02D 41/22* (2006.01)
*B60W 50/02* (2012.01)
*B60W 20/40* (2016.01)
*B60W 50/14* (2020.01)
*F02D 41/26* (2006.01)
*B60W 20/00* (2016.01)

(52) U.S. Cl.
CPC .......... *B60W 50/14* (2013.01); *F02D 41/009* (2013.01); *F02D 41/0097* (2013.01); *F02D 41/22* (2013.01); *F02D 41/26* (2013.01); *B60W 20/00* (2013.01); *B60W 2510/0638* (2013.01); *B60W 2510/0685* (2013.01); *F02D 2041/228* (2013.01); *F02D 2200/101* (2013.01)

(56) References Cited

U.S. PATENT DOCUMENTS

| | | | | |
|---|---|---|---|---|
| 5,743,233 | A * | 4/1998 | Unland | G01L 23/225 |
| | | | | 123/406.37 |
| 7,832,259 | B2 * | 11/2010 | Wang | F02D 35/024 |
| | | | | 73/114.25 |
| 2010/0071448 | A1 | 3/2010 | Akimoto et al. | |
| 2011/0120423 | A1 * | 5/2011 | Borchsenius | F02D 41/008 |
| | | | | 123/494 |
| 2011/0208401 | A1 | 8/2011 | Pantring et al. | |
| 2011/0224853 | A1 | 9/2011 | Kieser | |
| 2018/0051563 | A1 * | 2/2018 | Schwoller | F01B 21/02 |

FOREIGN PATENT DOCUMENTS

| | | | |
|---|---|---|---|
| DE | 102005012835 A1 | 3/2006 | |
| DE | 102005040780 A1 | 3/2007 | |
| DE | 102008042307 A1 | 4/2010 | |
| DE | 102012219466 A1 | 4/2014 | |
| DE | 102013013540 A1 | 2/2015 | |
| DE | 102013220814 B3 | 2/2015 | |
| EP | 0437057 A1 | 7/1991 | |
| EP | 0560793 B1 | 5/1995 | |
| EP | 1914101 A2 | 4/2008 | |
| JP | 2001045611 A | 2/2001 | |
| JP | 2007290663 A | 11/2007 | |
| WO | 9118198 A1 | 11/1991 | |
| WO | 9209874 A1 | 6/1992 | |
| WO | 2013136159 A1 | 9/2013 | |

OTHER PUBLICATIONS

Search Report including Provisional Assessment of Patentability issued by the German Patent and Trademark Office for German Patent Application No. DE 10 2014 221 293.6, dated Apr. 24, 2015.
International Search Report for International Application No. PCT/EP2015/070782 and translation thereof, dated Apr. 1, 2016.
International Preliminary Report on Patentability for International Application No. PCT/EP2015/070782 including Witten Opinion of the International Searching Authority and translation thereof, dated Apr. 25, 2017.
Search Report dated Jul. 3, 2019, issued by the State Intellectual Property Office of People's Republic of China for Chinese Patent Application No. CN 201580057371.6 which is related to U.S. Appl. No. 15/493,081.
Office Action dated Jul. 11, 2019 and translation thereof, issued by the State Intellectual Property Office of People's Republic of China for Chinese Patent Application No. CN 201580057371.6 which is related to U.S. Appl. No. 15/493,081.

* cited by examiner

METHOD AND CONTROL DEVICE FOR DETECTING A COMBUSTION PROCESS OF AN INTERNAL COMBUSTION ENGINE OF A HYBRID VEHICLE

CROSS-REFERENCE TO RELATED APPLICATIONS

This application is a continuation, under 35 U.S.C. § 120, of copending International Application No. PCT/EP2015/070782, filed Sep. 11, 2015, which designated the United States; this application also claims the priority, under 35 U.S.C. § 119, of German Patent Application No. DE 10 2014 221 293.6, filed Oct. 21, 2014; the prior applications are herewith incorporated by reference in their entirety.

BACKGROUND OF THE INVENTION

Field of the Invention

The invention relates to a method and to a control device for detecting a combustion process in an internal combustion engine of a hybrid vehicle.

Hybrid vehicles are distinguished by two different types of drive systems which, depending on the situation, can be operated simultaneously, that is to say in a hybrid fashion, or independently of one another. Hybrid vehicles frequently contain an internal combustion engine and an electric drive as drive systems.

If the internal combustion engine cannot provide any torque or can only provide insufficient torque, e.g. in the event of a fault, if the vehicle is refuelled with the wrong fuel or the like, during simultaneous operation of the internal combustion engine and of the electric drive, i.e. in the "hybrid driving" operating mode, the electric drive may "entrain" the internal combustion engine. In this case, the driver is provided with a display of a rotational speed signal by the internal combustion engine and assumes that the latter is functioning correctly. As a result of the internal combustion engine being entrained by the electric drive, the battery is quickly run flat, which can cause the vehicle to become immobilized. If fuel is injected during the unintentional entrainment of the internal combustion engine, the fuel is not burned and can accumulate in the exhaust section, for example in a catalytic converter, and damage the latter through possible later ignition.

The prior art describes various possible ways of monitoring the combustion in an internal combustion engine and detecting a failure of the internal combustion engine. For example, German Patent Application Publication DE 10 2005 040 780 A1 proposes adjusting a control variable in accordance with a setpoint torque, measuring an actual torque and detecting faulty operation of the internal combustion engine from the comparison of the setpoint torque with the actual torque. However, this method requires a device for measuring the actual torque.

German Patent Application Publication DE 10 2008 042 307 A1 describes measuring the rotational speed of an internal combustion engine and the rotational speed of an electric drive of a hybrid vehicle and detecting faulty operation of the internal combustion engine through a comparison of the rotational speeds. Further possibilities for monitoring an internal combustion engine in a hybrid vehicle are disclosed in European Patent Application Publication EP 1 914 101 A2 and in International Patent Application Publication WO 2013/136159 A1.

SUMMARY OF THE INVENTION

It is accordingly an object of the invention to provide a method and a control device for detecting a combustion process of an internal combustion engine of a hybrid vehicle which at least partially overcome the aforementioned disadvantages of the heretofore-known methods and devices of this general type.

With the foregoing and other objects in view there is provided, in accordance with the invention, a method for detecting a combustion process of an internal combustion engine of a hybrid vehicle wherein the internal combustion engine includes a crankshaft, the method includes the steps of:

acquiring a rotational speed signal representing a rotational speed of the crankshaft;

acquiring a crankshaft angle signal representing a crankshaft angle of the crankshaft; and determining, based on the rotational speed signal and the crankshaft angle signal, whether a combustion occurs in the internal combustion engine, wherein the step of determining includes detecting a rotational speed curve shape based on the rotational speed signal, wherein the rotational speed curve shape includes a dead center rotational speed and a rotational speed maximum, wherein the dead center rotational speed is reached when a cylinder piston of the internal combustion engine is at a top dead center in a power stroke, and wherein the step of determining further includes ascertaining a maximum increase of the rotational speed, starting from the dead center rotational speed up to the rotational speed maximum, wherein the step of determining further includes ascertaining a reference rotational speed, at which a given percentage of the maximum increase is reached, and ascertaining a reference crankshaft angle associated with the reference rotational speed, wherein the step of determining whether a combustion occurs is based on a threshold angle and includes comparing the reference crankshaft angle to the threshold angle and detecting that a combustion occurs when the reference crankshaft angle exceeds the threshold angle.

According to another mode of the invention, the step of determining includes ascertaining a rotational speed or a rotational speed range and ascertaining a crankshaft angle or a crankshaft angle range based on the determined rotational speed or the determined rotational speed range. Additionally or alternatively the step of determining includes ascertaining a crankshaft angle or a crankshaft angle range and ascertaining a rotational speed or a rotational speed range based on the determined crankshaft angle or the determined crankshaft angle range.

According to another mode of the invention, the step of determining includes detecting, based on the rotational speed signal, at least one rotational speed characteristic selected from the group including a rotational speed minimum, a rotational speed maximum, a rotational speed inflection point and a rotational speed value range.

Another mode of the invention includes detecting that no combustion occurs when the reference crankshaft angle is smaller than the threshold angle.

Another mode of the invention includes notifying a driver of the hybrid vehicle.

Another mode of the invention includes uncoupling the internal combustion engine.

Another mode of the invention includes to continue moving the hybrid vehicle with an additional drive device as an independent drive.

According to another mode of the invention, the given percentage is any percentage between 20% and 40% of the maximum increase.

With the objects of the invention in view there is also provided, a data memory containing a computer program with instructions for executing a method of:

acquiring a rotational speed signal representing a rotational speed of a crankshaft of an internal combustion engine of a hybrid vehicle;

acquiring a crankshaft angle signal representing a crankshaft angle of the crankshaft; and determining, based on the rotational speed signal and the crankshaft angle signal, whether a combustion occurs in the internal combustion engine, wherein the step of determining includes detecting a rotational speed curve shape based on the rotational speed signal, wherein the rotational speed curve shape includes a dead center rotational speed and a rotational speed maximum, wherein the dead center rotational speed is reached when a cylinder piston of the internal combustion engine is at a top dead center in a power stroke, and wherein the step of determining further includes ascertaining a maximum increase of the rotational speed, starting from the dead center rotational speed up to the rotational speed maximum, wherein the step of determining further includes ascertaining a reference rotational speed, at which a given percentage of the maximum increase is reached, and ascertaining a reference crankshaft angle associated with the reference rotational speed, wherein the step of determining whether a combustion occurs is based on a threshold angle and includes comparing the reference crankshaft angle to the threshold angle and detecting that a combustion occurs when the reference crankshaft angle exceeds the threshold angle.

With the objects of the invention in view there is further provided, a control device for detecting a combustion process of an internal combustion engine of a hybrid vehicle, wherein the internal combustion engine has a crankshaft and a cylinder piston and wherein the control device includes:

a signal input configured to acquire a rotational speed signal representing a rotational speed of the crankshaft and a crankshaft angle signal representing a crankshaft angle of the crankshaft; and a processor configured to determine, based on the rotational speed signal and the crankshaft angle signal, whether a combustion occurs in the internal combustion engine, wherein the processor detects a rotational speed curve shape based on the rotational speed signal, wherein the rotational speed curve shape includes a dead center rotational speed and a rotational speed maximum, wherein the dead center rotational speed is reached when the cylinder piston of the internal combustion engine is at a top dead center in a power stroke, and the processor ascertains a maximum increase of the rotational speed, starting from the dead center rotational speed up to the rotational speed maximum, the processor ascertains a reference rotational speed at which a given percentage of the maximum increase is reached, the processor ascertains a reference crankshaft angle associated with the reference rotational speed, and the processor determines whether a combustion occurs based on a threshold angle and compares the reference crankshaft angle to the threshold angle and detects that a combustion occurs when the reference crankshaft angle exceeds the threshold angle.

With the objects of the invention in view there is also provided, a hybrid vehicle which includes:

a plurality of drive systems, a first one of the drive systems being configured as an internal combustion engine with a crankshaft and a cylinder piston, a second one of the drive systems being configured as an electric drive;

a control device for detecting a combustion process of the internal combustion engine, the control device acquiring a rotational speed signal representing a rotational speed of the crankshaft and acquiring a crankshaft angle signal representing a crankshaft angle of the crankshaft; and the control device determining, based on the rotational speed signal and the crankshaft angle signal, whether a combustion occurs in the internal combustion engine, wherein the control device detects a rotational speed curve shape based on the rotational speed signal, wherein the rotational speed curve shape includes a dead center rotational speed and a rotational speed maximum, wherein the dead center rotational speed is reached when the cylinder piston of the internal combustion engine is at a top dead center in a power stroke, and the control device ascertains a maximum increase of the rotational speed, starting from the dead center rotational speed up to the rotational speed maximum, the control device ascertains a reference rotational speed at which a given percentage of the maximum increase is reached, the control device ascertains a reference crankshaft angle associated with the reference rotational speed, and the control device determines whether a combustion occurs based on a threshold angle and compares the reference crankshaft angle to the threshold angle and detects that a combustion occurs when the reference crankshaft angle exceeds the threshold angle.

According to one aspect, the present invention relates to a method for detecting a combustion process in an internal combustion engine of a hybrid vehicle, which combustion engine has a crankshaft, the method including the steps of:

acquiring a rotational speed signal which represents a rotational speed of the crankshaft;

acquiring a crankshaft angle signal which represents a crankshaft angle of the crankshaft; and determining, on the basis of the rotational speed signal and the crankshaft angle signal, whether combustion is taking place in the internal combustion engine.

According to a further aspect, the present invention relates to a control device for detecting a combustion process in an internal combustion engine of a hybrid vehicle, which internal combustion engine has a crankshaft, wherein the control device is configured to carry out a method according to the previous aspect.

Further advantageous refinements of the invention can be found in the dependent claims and the following description of preferred exemplary embodiments of the present invention.

The present invention relates to a method for detecting a combustion process in an internal combustion engine of a hybrid vehicle, wherein the internal combustion engine has a crankshaft. The hybrid vehicle can have, apart from the internal combustion engine, an additional drive device, for example an electric drive or a gas drive. The internal combustion engine and the additional drive device can preferably be coupled to one another via a decoupling clutch, in order to drive the hybrid vehicle in hybrid mode, i.e. simultaneously with the internal combustion engine and the additional drive device.

According to the inventive method, a rotational speed signal which represents a rotational speed of the crankshaft, and a crankshaft angle signal which represents a crankshaft angle of the crankshaft, are acquired. The rotational speed signal and/or the crankshaft angle signal are preferably high-resolution signals, for example oscillating high-resolution signals. On the basis of the rotational speed signal and of the crankshaft angle signal it is then determined whether combustion is taking place in the internal combustion engine.

Determining whether combustion is taking place on the basis of the rotational speed signal and of the crankshaft angle signal is possible because a rotational speed signal of an internal combustion engine which runs independently on its own is phase shifted with respect to a rotational speed signal of an internal combustion engine which is entrained. In the case of the entrained internal combustion engine, a cylinder piston of the internal combustion engine reaches a top dead center at a rotational speed minimum in the power stroke. In the case of the independently running internal combustion engine, a cylinder piston of the internal combustion engine already reaches a top dead center in the power stroke before a rotational speed minimum.

An explanation of this phase shift can be found in the torque balance, into which the torque from the combustion, the torque from the expansion and compression of the air in the cylinder, the frictional torque and the loss torque and the drag torque are input by the additional drive device. The torque of the entrained internal combustion engine corresponds essentially to the torque from the expansion and compression since the torque from the combustion is zero (no combustion takes place), and the frictional torque and the loss torque and the drag torque cancel one another out. The torque from the expansion and compression has a zero point when a cylinder piston is at a top dead center in the power stroke. In contrast to this, the torque of the independently running internal combustion engine arises from the torque from the combustion, the torque from the expansion and compression and the frictional torque and loss torque. The drag torque is zero. The torque from the combustion and from the expansion and compression has a zero point when the cylinder piston is at a top dead center in the power stroke. However, owing to the frictional torque and the loss torque there is a shift in the zero point with the result that the cylinder piston is at a top dead center in the power stroke even before the zero point is reached. Since the torque is proportional to the angular acceleration and the angular acceleration is proportional to the derivative of the angular speed over time (time derivative), a shift in the minimum values which is comparable to the shift in the zero points of the torque occurs for the angular speed which is proportional to the rotational speed. It is possible to explain in a similar way a phase shift in the crankshaft angle whose derivative over time yields the angular speed.

Since a rotational speed sensor is usually provided in every motor vehicle to monitor the rotational speed and the crankshaft angle of the crankshaft, the method according to the invention can be based on the signal of this rotational speed sensor. The inventive method brings about a situation in which, without installing an additional sensor such as e.g. a temperature sensor or a pressure sensor and without active intervention, e.g. without adjustment of the ignition angle of individual cylinders, it is possible to detect in close to real time conditions whether the internal combustion engine is running independently or whether the internal combustion engine is being entrained by the additional drive device, or whether there is a failure of the internal combustion engine.

The method for detecting a combustion process in the internal combustion engine can be carried out in different operating states of the internal combustion engine. In some exemplary embodiments, the method can be carried out both in the idling mode and under various loads.

If it is detected during determining whether combustion is taking place that the internal combustion engine is being entrained, i.e. no combustion or unsuitable combustion is taking place in the internal combustion engine, the internal combustion engine can be uncoupled. A driver can be correspondingly informed and the vehicle can continue to move with the additional drive device as an independent drive, for example to a repair shop or to a filling station.

The acquisition of the rotational speed signal and/or the crankshaft angle signal can include receiving the rotational speed signal and/or the crankshaft angle signal, for example from a measuring apparatus or from a processing apparatus. The acquisition of the rotational speed signal and/or the crankshaft angle signal can additionally include measuring the rotational speed signal and/or the crankshaft angle signal through the use of the measuring apparatus and/or converting measured rotational speed signals and/or crankshaft angle signals through the use of the processing apparatus, for example to one or more data streams.

The rotational speed signal and/or the crankshaft angle signal can be made available by one or more measuring apparatuses. For example, the rotational speed signal and the crankshaft angle signal are received by one measuring apparatus each or by a common measuring apparatus. If the rotational speed signal and the crankshaft angle signal are supplied by a common measuring apparatus, the rotational speed signal and the crankshaft angle signal can be made available as a single signal by the measuring apparatus. The rotational speed signal and/or the crankshaft angle signal can also be made available by a processing apparatus.

The measuring apparatus can be a rotational speed sensor, for example a magnetostatic rotational speed sensor. The magnetostatic rotational speed sensor can have, for example, an encoder wheel with a plurality of magnetic segments or teeth and a magnetic field sensor, for example a Hall sensor. The encoder wheel can be attached to any desired position of the crankshaft, for example between two cylinders of the internal combustion engine or between the internal combustion engine and a decoupling clutch via which the internal combustion engine is connected to the additional drive device. In some exemplary embodiments, the encoder wheel can be arranged between the internal combustion engine and the decoupling element, and a dual-mass flywheel can be attached to the crankshaft between the encoder wheel and the uncoupling element. The dual-mass flywheel can be significant for a detection functionality of the internal combustion process insofar as it influences the oscillations on the crankshaft and therefore also the high-resolution rotational speed signal.

For determining whether combustion is taking place in the internal combustion engine, the rotational speed signal and/or the crankshaft angle signal can be present in the form of a data stream. The rotational speed signal can be made available as a function of the time, the magnetic segments or teeth of the encoder wheel of the rotational speed sensor or the crankshaft angle. The crankshaft angle signal can be made available as a function of the time or the rotational speed. The rotational speed signal is preferably present as a function of the crankshaft angle. Alternatively, the rotational speed signal and the crankshaft angle signal can both be made available as a function of the time.

According to the method of the invention, it is possible, when determining whether combustion is taking place, to determine a rotational speed or a rotational speed range on the basis of the rotational speed signal. Subsequently, a crankshaft angle, a crankshaft angle range or a crankshaft angle interval can be determined on the basis of the crankshaft angle signal and the determined rotational speed or the determined rotational speed range. On the basis of the determined crankshaft angle which is associated with the determined rotational speed or the determined rotational speed range, or on the basis of the determined crankshaft angle range or crankshaft angle interval which is associated with the determined rotational speed or the determined rotational speed range it is possible then to detect whether combustion is taking place in the internal combustion engine.

Alternatively, when determining whether combustion is taking place, it is possible to determine a crankshaft angle or a crankshaft angle range on the basis of the crankshaft angle signal. Subsequently, a rotational speed or a rotational speed range can be determined on the basis of the rotational speed signal and the determined crankshaft angle or the determined crankshaft angle range. On the basis of the determined rotational speed which is associated with the determined crankshaft angle or the determined crankshaft angle range, or on the basis of the determined rotational speed range which is associated with the determined crankshaft angle or the determined crankshaft angle range, it is then possible to detect whether a combustion occurs.

Since a rotational speed signal and a crankshaft angle signal are already available for other applications in conventional motor vehicles, the rotational speed signal which is present and the crankshaft angle signal which is present can be used to determine whether combustion is taking place, and therefore no changes, or only minor changes, to the hardware of a motor vehicle are necessary.

The process of determining on the basis of the determined crankshaft angle which is associated with the rotational speed or the rotational speed range or the determined crankshaft angle range or crankshaft angle interval which is associated with the rotational speed or the rotational speed range will now be described in more detail below. More details will be given below on the alternative determining process on the basis of the rotational speed which is associated with the crankshaft angle or the crankshaft angle range and the correspondingly associated rotational speed range.

Determining whether combustion is taking place can include detecting a rotational speed minimum, a rotational speed maximum, a rotational speed inflection point, a rotational speed value range and/or a rotational speed curve shape on the basis of the rotational speed signal. It is also possible to detect a different rotational speed value of the rotational speed signal at which the rotational speed signal has, for example, a characteristic gradient and/or a characteristic curvature and/or other characteristic properties. A rotational speed or a rotational speed range is preferably detected during a power stroke of the internal combustion engine since changes in the rotational speed signal which depend on the combustion are more conspicuous during the power stroke than in other strokes of the internal combustion engine. The power stroke is to be understood as the stroke of the internal combustion engine during which work is performed at a cylinder piston of the internal combustion engine.

For example, the rotational speed which is determined on the basis of the rotational speed signal is the detected rotational speed minimum, the detected rotational speed maximum, the detected rotational speed inflection point or the other detected rotational speed value. When determining the crankshaft angle, the crankshaft angle which is associated with the detected rotational speed minimum, rotational speed maximum, rotational speed inflection point or rotational speed value can be detected as a determined crankshaft angle.

The rotational speed range which is determined on the basis of the rotational speed signal can alternatively be a rotational speed value range or a rotational speed curve shape. The detected or determined rotational speed curve shape can be a portion of the rotational speed signal which has, for example, a position of a dead center, a rotational speed minimum and/or a rotational speed maximum, or contains such a portion. The position of a dead center is, for example, a position in the rotational speed signal which is reached when a cylinder piston of the internal combustion engine is at a top dead center in the power stroke (ZOT). The rotational speed minimum can be a local minimum of the rotational speed signal, for example a rotational speed minimum which occurs before, when or after the position of the dead center is reached. The rotational speed maximum can be a local maximum of the rotational speed signal, for example a rotational speed maximum which occurs after the position of the dead center is reached. The portion can therefore preferably contain a rotational speed structure of the rotational speed signal during the power stroke of a cylinder piston of the internal combustion engine, since in such a section the combustion-dependent changes in the rotational speed signal can be detected better than during other strokes. However, in some exemplary embodiments the portion can also contain an oscillation of the rotational speed signal, in particular a complete oscillation of the rotational speed signal.

When determining the crankshaft angle range or crankshaft angle interval, the crankshaft angle range or crankshaft angle interval which is associated with the detected rotational speed value range or the detected rotational speed curve shape can be detected as a determined crankshaft angle range or crankshaft angle interval. For example, the detected or determined rotational speed curve shape can be a portion which contains a position of the dead center and a rotational speed minimum, and an angle interval between the dead center crankshaft angle at the position of the dead center and the crankshaft angle at the rotational speed minimum is detected as a determined crankshaft angle interval.

The detection of the determined crankshaft angle or of the crankshaft angle range or crankshaft angle interval can be carried out by reading off from a diagram in which, for example, the rotational speed is plotted against the crankshaft angle. Alternatively, the determined crankshaft angle or the crankshaft angle range or crankshaft angle interval can be detected by determining a point in time which is associated with the determined rotational speed, or a time range or a time period which is associated with the determined rotational speed range, and can be carried out by defining the determined crankshaft angle at this point in time or the determined crankshaft angle range during this time range or this time period.

In some exemplary embodiments, a reference rotational speed can be determined from the detected or determined rotational speed curve shape, and the crankshaft angle can be detected on the basis of the reference rotational speed. A possible method for determining the reference rotational speed is described below.

For example, the portion of the rotational speed curve shape contains a position of a dead center and a rotational speed maximum which follows the position of the dead center. Taking such a rotational speed curve shape as a starting point, in order to determine whether combustion is taking place it is also a possibility to determine a maximum increase in the rotational speed from the position of the dead center up to the rotational speed maximum. For example, an absolute value of a difference between the rotational speed maximum and a dead center rotational speed is determined at the position of the dead center.

The reference rotational speed can be determined on the basis of the maximum increase in the rotational speed. The reference rotational speed is, for example, the sum of the dead center rotational speed and a predefined percentage of the maximum increase, for example a predefined percentage of an absolute value of the difference between the rotational speed maximum and the dead center rotational speed. The reference rotational speed which is determined in this way is robust. Reference rotational speeds which have been correspondingly determined for different rotational speed signals which have changed as a function of the combustion of the internal combustion engine form a reliable comparison basis for determining whether combustion is taking place in the internal combustion engine.

The predefined percentage can assume any desired value between 0% and 100%. In some exemplary embodiments, the predefined percentage lies in the range from 20% to 40%. For example the predefined percentage can be approximately 27%. Depending on the structure of the rotational speed curve shape of an internal combustion engine, different values can be selected for the predefined percentage for different internal combustion engines.

Once the reference rotational speed has been defined, a reference crankshaft angle which is associated with this reference rotational speed can be determined. For this purpose, for example the rotational speed signal can be plotted against the crankshaft angle and the reference crankshaft angle which is associated with the reference rotational speed can be read off. Alternatively, the rotational speed signal and the crankshaft angle signal can be plotted against the same variable, for example the time. In this case, a point in time can be determined at which the reference rotational speed occurs, and the crankshaft angle can be determined at this point in time.

The determined crankshaft angle can therefore be either a crankshaft angle which is detected directly on the basis of the detected or determined rotational speed or a crankshaft angle which is detected on the basis of the reference rotational speed.

As already mentioned above, a crankshaft angle can also be determined and a rotational speed can be detected as a function of the determined crankshaft angle. For example, the dead center crankshaft angle or another characteristic crankshaft angle can be determined, and a rotational speed can be detected as a function of the dead center crankshaft angle or the other characteristic crankshaft angle. The dead center crankshaft angle is the angle which is reached when a cylinder piston of the internal combustion engine is at a top dead center in a power stroke.

According to the method of the invention, determining whether combustion is taking place can take place on the basis of the rotational speed signal and the crankshaft angle signal as well as on the basis of a threshold value or a threshold value range or threshold value interval. Alternatively, determining whether combustion is taking place can be carried out on the basis of the rotational speed signal and the crankshaft angle signal as well as on the basis of a dead center crankshaft angle and/or a dead center rotational speed. In some exemplary embodiments, determining whether combustion is taking place can be carried out on the basis of the rotational speed signal and the crankshaft angle signal, on the basis of a threshold value or a threshold value range or threshold value interval, and on the basis of a dead center crankshaft angle and/or a dead center rotational speed. The threshold value or the threshold value range or threshold value interval and/or the dead center crankshaft angle or the dead center rotational speed can be stored in a data memory and be called when necessary. The dead center crankshaft angle can depend on the structure of the measuring apparatus.

To determine whether combustion is taking place in the internal combustion engine, the determined crankshaft angle or the reference crankshaft angle can be compared with a threshold value, and when the determined crankshaft angle or the reference crankshaft angle exceeds the threshold value it is possible to detect that combustion is taking place. Correspondingly, the determined crankshaft angle range or crankshaft angle interval can be compared with a threshold range or threshold interval, and when the reference crankshaft angle range or reference crankshaft angle interval exceeds the threshold range or the threshold interval it is possible to detect that combustion is taking place.

For example, as described above, a crankshaft angle is determined using the determined rotational speed or the reference rotational speed. The determined crankshaft angle can be compared with a threshold value, and if the crankshaft angle is larger than the threshold value it can be detected that combustion is taking place. If the crankshaft angle is smaller than the threshold value or of equal magnitude, it can be detected that no combustion, or unsuitable combustion, is taking place. If the reference crankshaft angle is determined on the basis of the maximum increase, the threshold value can increase as the percentage rises. In some exemplary embodiments, the threshold value can increase in the range from 1° to 80°, in particular in the range from 22° to 36°, wherein the dead center crankshaft angle is 0°. For example, the threshold value is approximately 24°.

In a similar way, a crankshaft angle range or crankshaft angle interval can be determined using a determined rotational speed range or a rotational speed curve shape and on the basis of the determined crankshaft angle range and a threshold value range or on the basis of the determined crankshaft angle interval and a threshold interval it is possible to determine whether or not combustion is taking place.

In some exemplary embodiments, a crankshaft angle can be determined on the basis of the determined rotational speed, for example the rotational speed minimum. If the determined crankshaft angle corresponds in this example to the dead center crankshaft angle, or if it differs from the dead center crankshaft angle by only a few degrees, for example a maximum of 5°, it is detected that no combustion is taking place and the internal combustion engine is being entrained. If the determined crankshaft angle differs from the dead center crankshaft angle by more than 5°, it is determined that combustion is taking place.

In some exemplary embodiments, an angle interval between the dead center crankshaft angle and the determined crankshaft angle is determined as described above. If the angle interval is larger than a threshold interval, it is determined in this example that combustion is taking place in the internal combustion engine, whereas, when the angle interval is smaller than the threshold interval or equal to the threshold interval, it is determined that no combustion, or unsuitable combustion, is taking place and the internal combustion engine is being entrained.

Instead of determining a rotational speed and a crankshaft angle in order to determine on the basis thereof whether combustion is taking place, a phase shift between the acquired rotational speed signal and a reference rotational speed signal can be determined. The reference rotational speed signal can be a rotational speed signal which is determined or simulated in advance and which represents, for example, a rotational speed during the entraining of the internal combustion engine or during the combustion of the internal combustion engine. The reference rotational speed signal can be stored in a data memory, for example a data memory of a processing apparatus. The acquired rotational speed signal and/or the reference rotational speed signal can be present as a function of the crankshaft angle, wherein the dead center crankshaft angle of the acquired rotational speed signal and of the reference rotational speed signal preferably have the same value, for example 0°.

As already mentioned above, the rotational speed signal and/or the crankshaft angle signal can be an oscillating signal. The signal can contain successive oscillations, each with a minimum and a maximum, and during each oscillation one of the cylinder pistons of the internal combustion engine passes through a top dead center in a power stroke. The method according to the invention can be carried out for a plurality of successive or selected portions or oscillations during the operation of the hybrid vehicle, in order to be able to check the functional capability of the internal combustion engine while the hybrid vehicle is operating, for example during the idling mode and/or under different loads.

Since brief signal fluctuations which are not related to whether combustion is generally taking place or not can occur while the hybrid vehicle is operating, a window with a multiplicity of oscillations can be selected. For each oscillation it is possible, as described above, to determine individually whether combustion is taking place. On the basis of the results which are determined in this way it is possible, despite individual irregularities, to detect with increased reliability whether combustion is taking place or not. For example, the determined results can be compared with one another. If a fraction of the determined results does not correspond to the majority of the results, the fraction of the results can be rejected and the result which is confirmed by the majority of the determined results can be output as the result. Majority is to be understood here as meaning more than 70%, in particularly more than 90%, in particular more than 95%, of the determined results, and fraction is to be understood as meaning the remaining part of the results.

A window of oscillations can contain, for example, 100 to 200 oscillations, e.g. 160 oscillations. Given a rotational speed of the crankshaft of more than 800 rpm (revolutions per minute), which is normally reached when a hybrid vehicle is operating, it can therefore be reliably detected within a few seconds that there has been a failure of the internal combustion engine.

The window can shift with the time in order to be able to reliably determine during a relatively long time period, for example during the entire operation of the hybrid vehicle, whether the internal combustion engine is running independently or is being entrained by the additional drive device. The window can shift by this oscillation with each oscillation. After each shift, the determined results for all oscillations in the window are analyzed, and on this basis it is detected whether combustion is taking place or not. The reliability of the method according to the invention can therefore be increased.

The situation of the entraining of the internal combustion engine by the additional drive device can be detected both in the stationary state and during travel, and the driver can be correspondingly informed. The driver can then move the vehicle with the additional drive device into a repair shop without the vehicle becoming immobilized. Further starts of the internal combustion engine can be prohibited in order to avoid the ignition of possibly collected unburnt fuel in the exhaust section. In addition, there is no need for a change of hardware (e.g. additional sensors).

According to the method of the invention, a plausibility check can be carried out in order to be able to determine the operating status of the internal combustion engine even more reliably. For this purpose, e.g. a signal quality level can be checked, in particular within a window of oscillations. The signal quality level and the determined results as to whether combustion is taking place or not can be used for a diagnosis so that the entraining of the internal combustion engine can be displayed to a driver, for example through the use of an optical and/or acoustic signal. For example, the diagnostic result is displayed on a display of the vehicle.

The result as to whether combustion is taking place can be statistically ensured by additional measurements (heat, height, poor road surface, variation of components).

The present invention also relates to a data memory. The data memory can contain a computer program which has instructions for the execution of the method described above. In addition, a threshold value, threshold value ranges or threshold value intervals and/or a dead center crankshaft angle and/or dead center rotational speeds can be stored in the data memory.

The present invention also relates to a control device for detecting a combustion process in an internal combustion engine of a hybrid vehicle, which internal combustion engine has a crankshaft, wherein the control device is configured to carry out a method as has been described above.

The control device can have one or more signal inputs in order to acquire a rotational speed signal which represents a rotational speed of the crankshaft, and a crankshaft angle signal which represents a crankshaft angle of the crankshaft. Furthermore, the control device can contain a processor and a data memory, for example the data memory according to the invention, in order to determine, on the basis of the acquired rotational speed signal and the acquired crankshaft angle signal, whether combustion is taking place in the internal combustion engine. The determination can be carried out as described above.

The present invention also relates to a hybrid vehicle having a control device which is described in the sections above, and a rotational speed sensor. The hybrid vehicle can have two or more drive systems, wherein one of the drive systems is an internal combustion engine. The further drive system can be embodied as an electric drive.

Although the invention is illustrated and described herein as embodied in a method and a control device for detecting a combustion process in an internal combustion engine of a hybrid vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

DETAILED DESCRIPTION OF THE INVENTION

Figure 1:
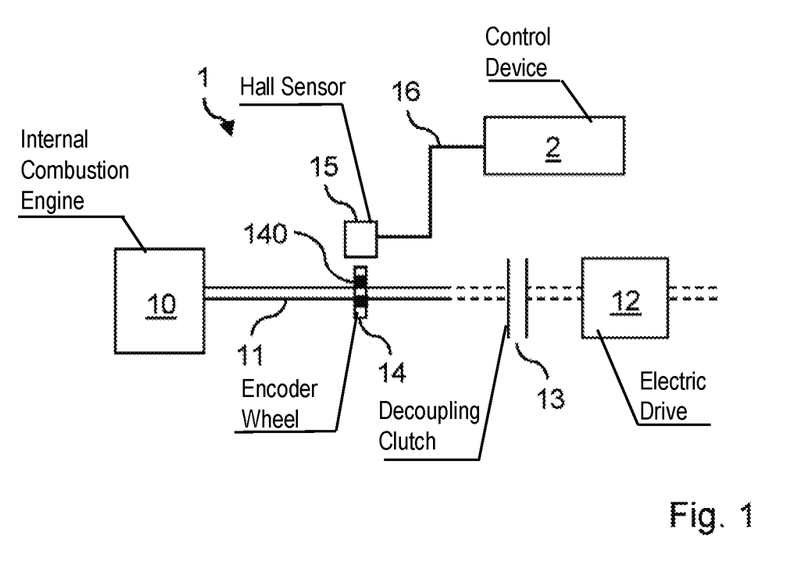
FIG. 1 is a schematic view of an exemplary embodiment of a drive train of a hybrid vehicle according to the invention.

Referring now to the figures of the drawing in detail and first, particularly, to FIG. 1 thereof, there is shown an exemplary embodiment of a drive train 1 of a hybrid vehicle. The drive train 1 of the hybrid vehicle contains an internal combustion engine 10 with a crankshaft 11, an electric drive 12 and a decoupling clutch 13 via which the electric drive 12 is coupled to the crankshaft 11 of the internal combustion engine 10.

The drive train 1 also contains a rotational speed sensor which has an encoder wheel 14 with 58 teeth 140 and a Hall sensor 15. The encoder wheel 14 is attached to the crankshaft 11 between the internal combustion engine 10 and the decoupling clutch 13. The Hall sensor 15 senses the encoder wheel 14 during a rotation of the crankshaft 11 and generates a high-resolution oscillating rotational speed signal 30, 31, as is shown by way of example in FIGS. 2A and 2B. The rotational speed signal 30, 31 of the Hall sensor 15 is fed to a control device 2 via a databus 16.

Figure 2A:
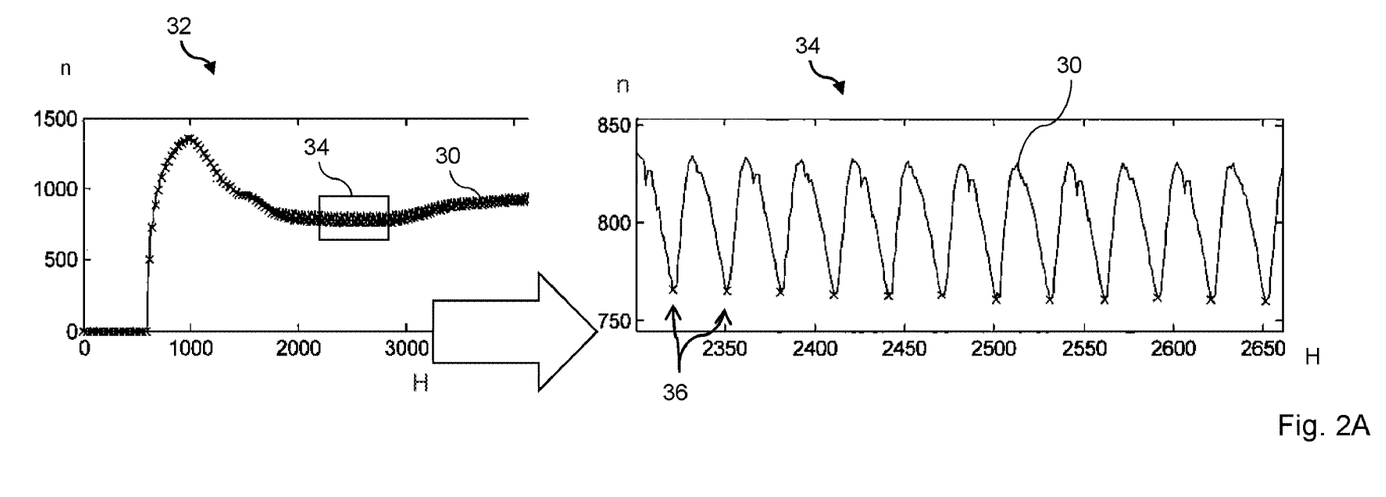
FIGS. 2A and 2B are graphs illustrating rotational speed signals of an internal combustion engine of a hybrid vehicle in accordance with the invention.
Figure 2B:
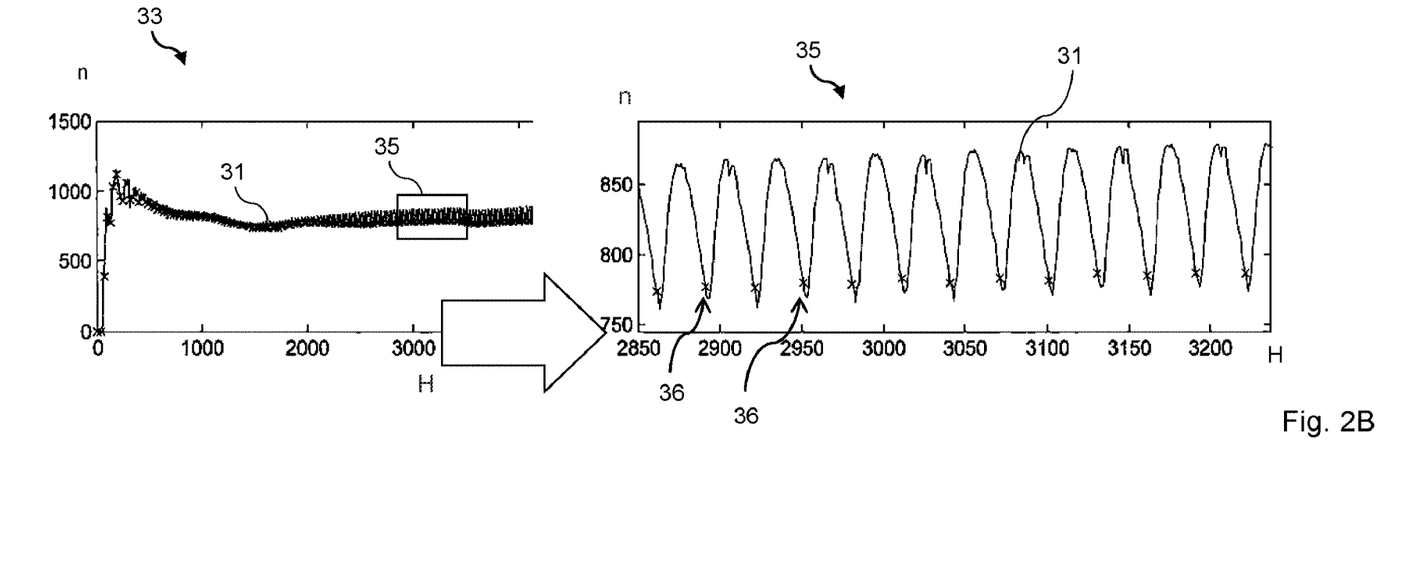

FIGS. 2A and 2B each show on the left a diagram 32, 33 in which a rotational speed n of the internal combustion engine 10 is plotted against an index H which depends on the configuration of the encoder wheel 14 of the rotational speed sensor, as the rotational speed signal 30, 31. On the right, FIGS. 2A and 2B each show an enlarged portion 34, 35 of the rotational speed signal 30, 31, in which there are additionally positions of the dead centers 36 at which one of the cylinder pistons of the internal combustion engine is at the top dead center in the power stroke. The rotational speed signal 30 which is shown in FIG. 2A is a typical rotational speed signal of the internal combustion engine 10 while the latter is being entrained by the electric drive 12, which is apparent from the fact that the coordinates of the dead centers 36 are located at the minimum values of the rotational speed signal 30. The rotational speed signal 31 which is shown in FIG. 2B is a typical rotational speed signal of the internal combustion engine 10 while the latter is running independently, which is apparent from the fact that the positions of the dead centers 36 are shifted from the minimum values of the rotational speed signal 31. The rotational speed signals 30, 31 quickly rise strongly after the start at H≈700 for rotational speed signal 30 and at H≈100 for rotational speed 31 and subsequently settle at a requested rotational speed at H≈1400 for rotational speed signal 30 and at H≈700 for rotational speed 31, in FIGS. 2A and 2B an idling rotational speed in the region of 800 rpm.

Figure 3:
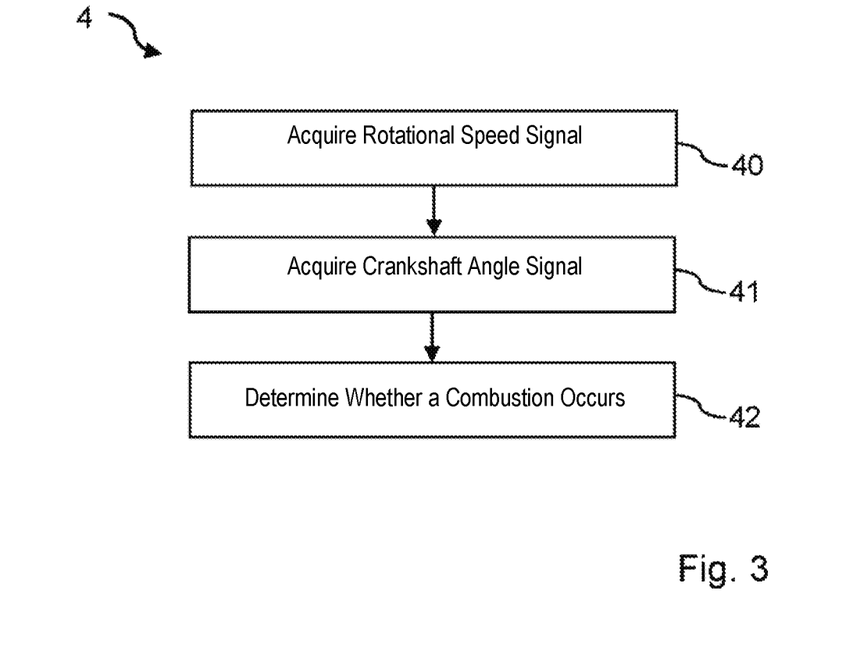
FIG. 3 is a flow chart of a method according to the invention for detecting a combustion process in an internal combustion engine.

The control device 2 is configured to carry out a method 4 for detecting a combustion process in the internal combustion engine 10 as is shown in the flowchart in FIG. 3. A rotational speed signal 30, 31 which represents a rotational speed n of the crankshaft 11 is acquired at 40. A crankshaft angle signal which represents a crankshaft angle φ of the crankshaft 11 is acquired at 41. At 42, it is determined, on the basis of the rotational speed signal 30, 31 and the crankshaft angle signal, whether combustion is taking place in the internal combustion engine 10.

Figure 4:
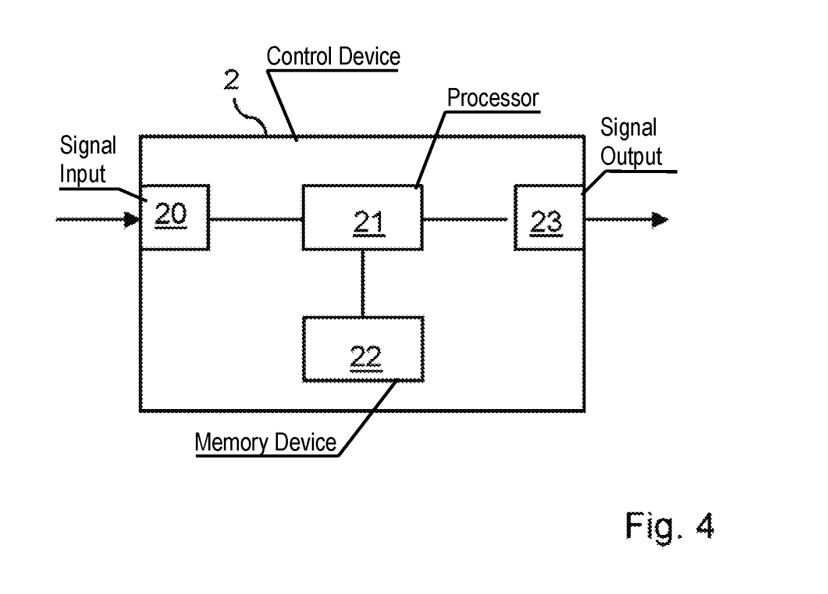
FIG. 4 is a schematic view of an exemplary embodiment of a control device for detecting a combustion process in accordance with the invention.

In order to carry out the method 4 for detecting a combustion process in the internal combustion engine, the control device 2 contains, as is shown in FIG. 4, a signal input 20 which can be connected to the databus 16 and via which the control device 2 receives the rotational speed signal 30, 31. The control device 2 also contains a processor 21 which is connected to the signal input 20, a memory device 22 which is connected to the processor 21, and a signal output 23 which is connected to the processor 21.

Figure 5A:
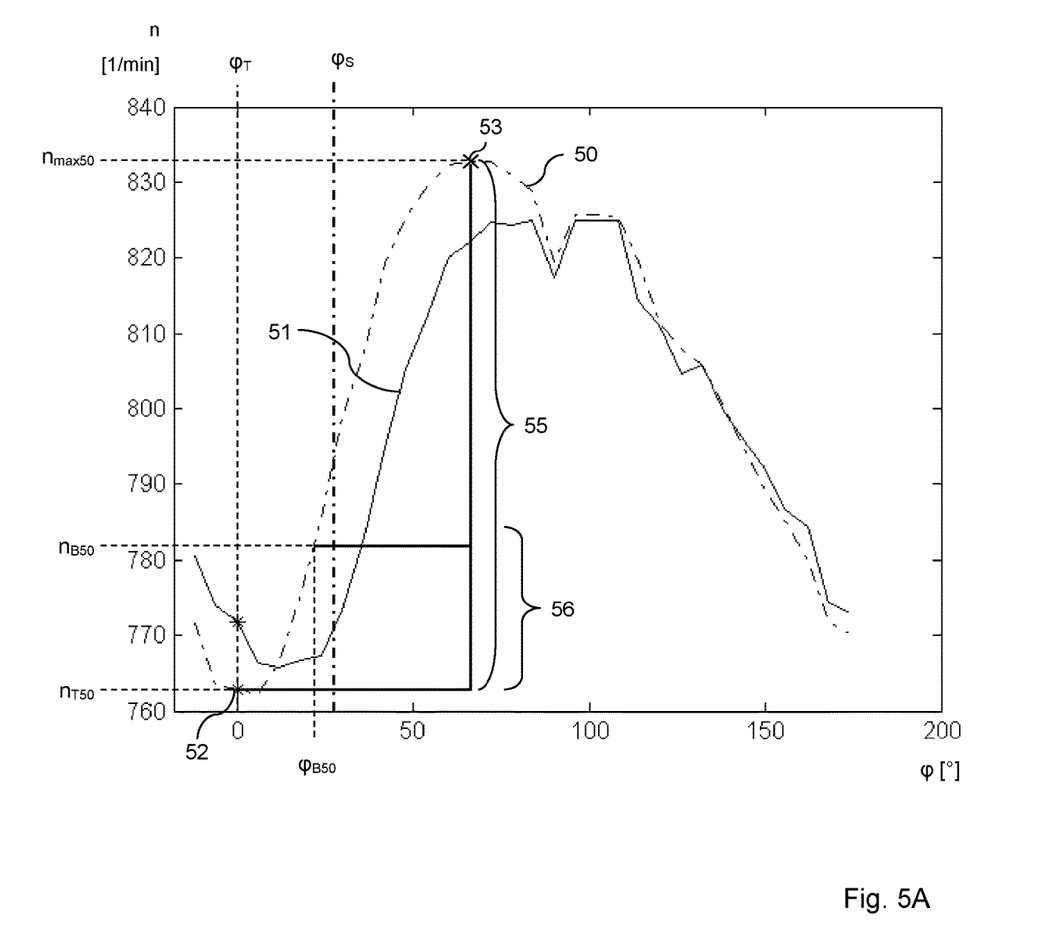
FIGS. 5A and 5B are graphs illustrating rotational speed signals and the determination whether a combustion occurs in accordance with the invention.
Figure 5B:
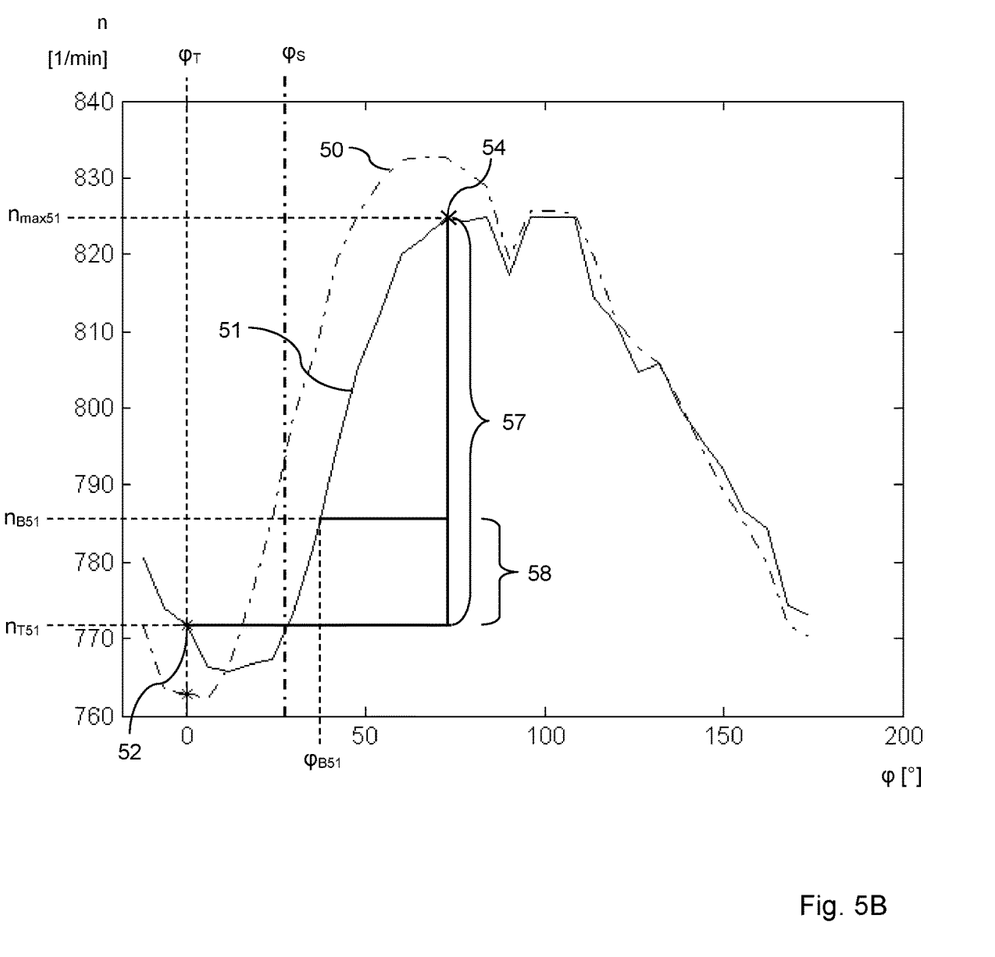

The rotational speed signal 30, 31 is received at the signal input 20 and passed on to the processor 21. In addition, information about the encoder wheel 14 of the rotational speed sensor is received as a crankshaft angle signal at the signal output 20, the information indicating a relation or ratio of the index H to the crankshaft angle. The rotational speed signal 30, 31 and the crankshaft angle signal are fed to the processor 21. The processor 21 converts the rotational speed signal 30, 31 on the basis of the crankshaft angle signal into a rotational speed signal 50, 51 as a function of the crankshaft angle, as shown in FIGS. 5A and 5B, and analyses the signal.

During the analysis of the rotational speed signal 50, 51, positions 52 of the dead centers are determined by determining a rotational speed $n_\tau$ which is associated with a dead center crankshaft angle $\varphi\tau$, wherein the dead center crankshaft angle $\varphi_\tau$ is defined as 0° in the present exemplary embodiment. For the rotational speed signal 50, the rotational speed $n_{\tau 50}$ is approximately 763 rpm, and for the rotational speed signal 51 the rotational speed $n_{\tau 51}$ is approximately 772 rpm. Furthermore, a rotational speed maximum 53, 54 which follow the positions 52 of the dead centers is determined, and the associated rotational speed $n_{max}$ is determined. For the rotational speed signal 50, the rotational speed $n_{max50}$ is approximately 832 rpm, and for the rotational speed signal 51, the rotational speed $n_{max51}$ is approximately 825 rpm.

For the rotational speed signal 50 a maximum increase in rotational speed is determined on the basis of the rotational speed $n_{\tau 50}$ and the rotational speed $n_{max50}$ by calculating the difference 55 between the rotational speeds $n_{max50}$ and $n_{\tau 50}$ ($n_{max50} - n_{\tau 50}$). Subsequently, a portion 56 of the difference 55 is calculated which corresponds to 27% of the difference 55, and is added to the rotational speed $n_{\tau 50}$ in order to acquire a reference rotational speed $n_{B50}$. An associated reference crankshaft angle $\varphi_{B50}$ is determined for the reference rotational speed $n_{B50}$. In order to detect whether combustion is taking place in the internal combustion engine 10, the reference crankshaft angle $\varphi_{B50}$ is compared with a threshold angle $\varphi_S$. Since the reference crankshaft angle $\varphi_{B50}$ is smaller than the threshold angle $\varphi_S$, it is determined that no combustion is taking place and the internal combustion engine 10 is being entrained by the electric drive 12.

Correspondingly, for the rotational speed signal 51 a maximum increase in the rotational speed is determined on the basis of the rotational speed $n_{\tau 51}$ and the rotational speed $n_{max51}$ by calculating the difference 57 between the rotational speeds $n_{max51}$ and $n_{\tau 51}$ ($n_{max51} n_{\tau 51}$). Subsequently, a portion 58 of the difference 57 is calculated which corresponds to 27% of the difference 57 and is added to the rotational speed $n_{\tau 51}$ in order to acquire a reference rotational speed $n_{B51}$. An associated reference crankshaft angle $\varphi_{B51}$ is determined for the reference rotational speed $n_{B51}$. This reference crankshaft angle $\varphi_{B51}$ is compared with the threshold angle $\varphi_S$. Since the reference crankshaft angle $\varphi_{B51}$ is larger than the threshold angle $\varphi_S$ it is determined that combustion is taking place and the internal combustion engine 10 is running independently.

In a further exemplary embodiment of a control device, the control device is embodied similarly to the control device 2 in FIG. 4. In addition, the control device is configured to detect a start of the internal combustion engine 10 and to start the process of determining whether combustion is taking place. After the detection of the start of the internal combustion engine, the control device 2 carries out a quality analysis of the received rotational speed signal 30, 31 and uses the result of the quality analysis as the basis for determining whether combustion is taking place. The control device carries out a diagnosis on the basis of the results of the quality analysis and the determination whether combustion is taking place, and generates a diagnostic signal in order to indicate to the driver that the driver should look for a repair shop if the internal combustion engine has failed, and in order, if appropriate, to prevent restarting of the internal combustion engine.

By using the method and device in accordance with the invention for detecting a combustion process in an internal combustion engine of a hybrid vehicle it is possible to reliably detect entraining of the internal combustion engine by the electric drive both in the stationary state and during travel. It thereby becomes possible to take precautions to avoid the vehicle becoming immobilized and/or damage to the internal combustion engine. In this context, it is not necessary to install additional hardware but rather it is possible to have recourse to the signal of a rotational speed sensor which is already present.

LIST OF REFERENCE CHARACTERS

1 Drive train
10 Internal combustion engine
11 Crankshaft
12 Electric drive
13 Decoupling clutch
14 Encoder wheel
140 Teeth of the encoder wheel
15 Hall sensor
16 Databus
2 Control device
20 Signal input
21 Processor
22 Memory device
23 Signal output
30, 31 Rotational speed signal
32, 33 Diagram
34, 35 Enlarged portion
36 Position of the dead centers
4 Method for detecting a combustion process
40 Acquiring a rotational speed signal
41 Acquiring a crankshaft angle signal
42 Determining whether a combustion occurs
50, 51 Rotational speed signal
52 Position of the dead centers
53, 54 Rotational speed maximum
5, 57 Difference
56, 58 Portion of the difference
H Index
n Rotational speed
$n_{max50}$, $n_{max51}$ Rotational speed at maximum of rotational speed signal 50, 51
$n_{B50}$, $n_{B51}$ Reference rotational speed of rotational speed signal 50, 51
$n_{\tau 50}$, $n_{\tau 51}$ Dead center rotational speed of rotational speed signal 50, 51
$\varphi$ Crankshaft angle
$\varphi_\tau$ Dead center crankshaft angle
$\varphi_{B50}$, $\varphi_{B51}$ Reference point crankshaft angle of rotational speed signal 50, 51
$\varphi_S$ Threshold angle

What is claimed is:

1. A method for detecting a combustion process of an internal combustion engine of a hybrid vehicle wherein the internal combustion engine includes a crankshaft, the method comprising:
acquiring a rotational speed signal representing a rotational speed of the crankshaft;
acquiring a crankshaft angle signal representing a crankshaft angle of the crankshaft; and
determining, based on the rotational speed signal and the crankshaft angle signal, whether a combustion occurs in the internal combustion engine, wherein the step of determining includes detecting a rotational speed curve shape based on the rotational speed signal, wherein the rotational speed curve shape includes a dead center rotational speed and a rotational speed maximum, wherein the dead center rotational speed is reached when a cylinder piston of the internal combustion engine is at a top dead center in a power stroke, and wherein the step of determining further includes ascertaining a maximum increase of the rotational speed, starting from the dead center rotational speed up to the rotational speed maximum, wherein the step of determining further includes ascertaining a reference rotational speed, at which a given percentage of the maximum increase is reached, and ascertaining a reference crankshaft angle associated with the reference rotational speed, wherein the step of determining whether a combustion occurs is based on a threshold angle and includes comparing the reference crankshaft angle to the threshold angle and detecting that a combustion occurs when the reference crankshaft angle exceeds the threshold angle.

2. The method according to claim 1, wherein the step of determining includes ascertaining one of a rotational speed and a rotational speed range and ascertaining one of a crankshaft angle and a crankshaft angle range based on one of the rotational speed and the rotational speed range.

3. The method according to claim 1, wherein the step of determining includes ascertaining one of a crankshaft angle and a crankshaft angle range and ascertaining one of a rotational speed and a rotational speed range based on one of the crankshaft angle and the crankshaft angle range.

4. The method according to claim 1, wherein the step of determining includes detecting, based on the rotational speed signal, at least one rotational speed characteristic selected from the group consisting of a rotational speed minimum, a rotational speed maximum, a rotational speed inflection point and a rotational speed value range.

5. The method according to claim 1, which comprises detecting that no combustion occurs when the reference crankshaft angle is smaller than the threshold angle.

6. The method according to claim 5, which comprises notifying a driver of the hybrid vehicle.

7. The method according to claim 5, which comprises uncoupling the internal combustion engine.

8. The method according to claim 5, which comprises continue moving the hybrid vehicle with an additional drive device as an independent drive.

9. The method according to claim 1, wherein the given percentage is any percentage between 20% and 40% of the maximum increase.

10. A data memory containing a computer program with instructions for executing a method of:
acquiring a rotational speed signal representing a rotational speed of a crankshaft of an internal combustion engine of a hybrid vehicle;
acquiring a crankshaft angle signal representing a crankshaft angle of the crankshaft; and
determining, based on the rotational speed signal and the crankshaft angle signal, whether a combustion occurs in the internal combustion engine, wherein the step of determining includes detecting a rotational speed curve shape based on the rotational speed signal, wherein the rotational speed curve shape includes a dead center rotational speed and a rotational speed maximum, wherein the dead center rotational speed is reached when a cylinder piston of the internal combustion engine is at a top dead center in a power stroke, and wherein the step of determining further includes ascertaining a maximum increase of the rotational speed, starting from the dead center rotational speed up to the rotational speed maximum, wherein the step of determining further includes ascertaining a reference rotational speed, at which a given percentage of the maximum increase is reached, and ascertaining a reference crankshaft angle associated with the reference rotational speed, wherein the step of determining whether a combustion occurs is based on a threshold angle and includes comparing the reference crankshaft angle to the threshold angle and detecting that a combustion occurs when the reference crankshaft angle exceeds the threshold angle.

11. A control device for detecting a combustion process of an internal combustion engine of a hybrid vehicle, the internal combustion engine having a crankshaft and a cylinder piston, the control device comprising:
a signal input configured to acquire a rotational speed signal representing a rotational speed of the crankshaft and a crankshaft angle signal representing a crankshaft angle of the crankshaft; and
a processor configured to determine, based on the rotational speed signal and the crankshaft angle signal, whether a combustion occurs in the internal combustion engine, wherein said processor detects a rotational speed curve shape based on the rotational speed signal, wherein the rotational speed curve shape includes a dead center rotational speed and a rotational speed maximum, wherein the dead center rotational speed is reached when the cylinder piston of the internal combustion engine is at a top dead center in a power stroke, and said processor ascertains a maximum increase of the rotational speed, starting from the dead center rotational speed up to the rotational speed maximum, said processor ascertains a reference rotational speed at which a given percentage of the maximum increase is reached, said processor ascertains a reference crankshaft angle associated with the reference rotational speed, and said processor determines whether a combustion occurs based on a threshold angle and compares the reference crankshaft angle to the threshold angle and detects that a combustion occurs when the reference crankshaft angle exceeds the threshold angle.

12. A hybrid vehicle comprising:
a plurality of drive systems, a first one of said drive systems being configured as an internal combustion engine with a crankshaft and a cylinder piston, a second one of said drive systems being configured as an electric drive;
a control device for detecting a combustion process of the internal combustion engine, said control device acquiring a rotational speed signal representing a rotational speed of said crankshaft and acquiring a crankshaft angle signal representing a crankshaft angle of said crankshaft; and
said control device determining, based on the rotational speed signal and the crankshaft angle signal, whether a combustion occurs in said internal combustion engine, wherein said control device detects a rotational speed curve shape based on the rotational speed signal, wherein the rotational speed curve shape includes a dead center rotational speed and a rotational speed maximum, wherein the dead center rotational speed is reached when said cylinder piston of said internal combustion engine is at a top dead center in a power stroke, and said control device ascertains a maximum increase of the rotational speed, starting from the dead center rotational speed up to the rotational speed maximum, said control device ascertains a reference rotational speed at which a given percentage of the maximum increase is reached, said control device ascertains a reference crankshaft angle associated with the reference rotational speed, and said control device determines whether a combustion occurs based on a threshold angle and compares the reference crankshaft angle to the threshold angle and detects that a combustion occurs when the reference crankshaft angle exceeds the threshold angle.

* * * * *

UNITED STATES PATENT AND TRADEMARK OFFICE
CERTIFICATE OF CORRECTION

PATENT NO. : 10,640,107 B2
APPLICATION NO. : 15/493081
DATED : May 5, 2020
INVENTOR(S) : Norbert Weiß et al.

Page 1 of 1

It is certified that error appears in the above-identified patent and that said Letters Patent is hereby corrected as shown below:

In the Specification

Column 14, Line 28: "$n_\tau$" should read: --$n_T$--

Column 14, Line 29: "$\varphi\tau$" should read: --$\varphi_T$--

Column 14, Line 30 and Column 16, Line 6: "$\varphi_\tau$" should read: --$\varphi_T$--

Column 14, Lines 32, 43, 44, 45, and 47 and Column 16, Line 3: "$n_{\tau 50}$" should read: --$n_{T50}$--

Column 14, Lines 33, 59, 61, and 64 and Column 16, Line 3: "$n_{\tau 51}$" should read: --$n_{T51}$--

Signed and Sealed this
Second Day of June, 2020

Andrei Iancu
*Director of the United States Patent and Trademark Office*